H. J. DANIELS.
MACHINE FOR HARVESTING POTATOES AND LIKE ROOT CROPS.
APPLICATION FILED AUG. 29, 1911.
1,033,675.
Patented July 23, 1912.
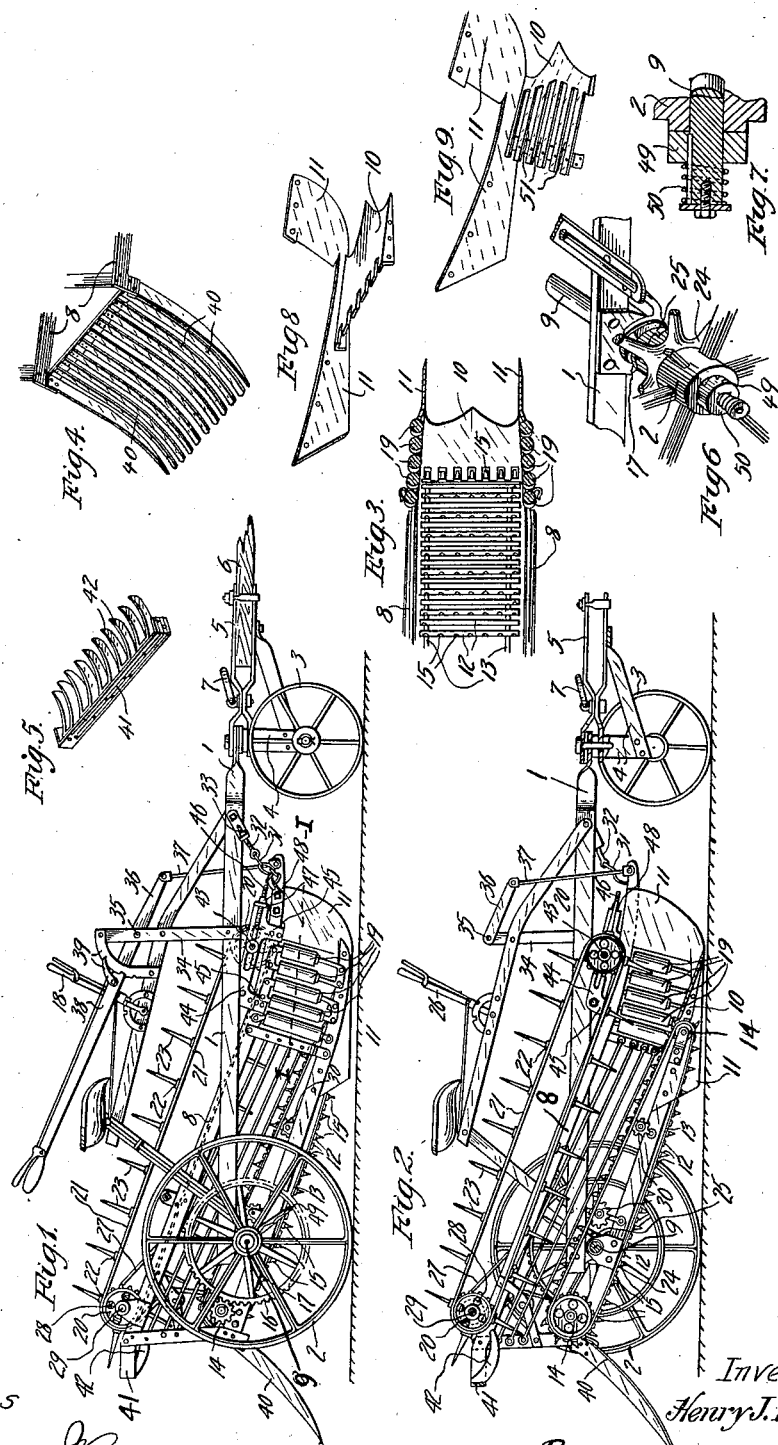
Witnesses
Inventor
Henry J. Daniels
By Victor J. Evans
Atty.

UNITED STATES PATENT OFFICE.

HENRY J. DANIELS, OF ALBERT PARK, VICTORIA, AUSTRALIA.

MACHINE FOR HARVESTING POTATOES AND LIKE ROOT CROPS.

1,033,675. Specification of Letters Patent. Patented July 23, 1912.

Application filed August 29, 1911. Serial No. 646,614.

*To all whom it may concern:*

Be it known that I, HENRY JOHN DANIELS, a subject of the King of Great Britain, residing at 86 Victoria avenue, Albert Park, in the State of Victoria, Commonwealth of Australia, farmer, have invented certain new and useful Improvements in Machines for Harvesting Potatoes and the Like Root Crops, of which the following is a specification.

This invention relates to improvements in potato harvesting machines and is directed particularly to the provision of exceedingly efficient means for making an implement of the above type perform its work with ease and rapidity. Furthermore, an implement constructed as hereinafter described can be economically manufactured and will be durable in wear while its various parts can be readily interchanged when worn without necessitating the employment of a skilled artisan.

In order that the invention may be thoroughly understood, reference will now be made to the accompanying sheets of explanatory drawings, wherein:—

Figure 1 is a view in side elevation of a machine fitted with the improvements constituting the present invention. Fig. 2 is a longitudinal sectional elevation of Fig. 1. Fig. 3 is a view in sectional plan taken on the dotted line I—I of Fig. 1. Figs. 4 to 9 are views illustrating details in the construction of the invention.

In these drawings like characters of reference have been employed to indicate similar parts in the different views and the numeral 1 designates an open frame or body which is supported on suitable traveling and steering wheels 2 and 3 respectively. The two hind or main traveling wheels 2 are located at the rear of the frame or body 1 and support the greater part of the weight of the implement while the front or steering wheels 3 are secured to the frame 1 and are operated in an approved manner. The axle of the steering wheel is preferably provided with a forwardly projecting bridle 4 and a double strap 5 for the reception of a pole 6. Any approved form of draft gear can be fitted to the said bridle 4 or to the pole strap 5 and it may be detachably connected to a ring 7 or in any other suitable way.

An openwork cradle 8 is pivotally mounted on the axle 9 of the traveling wheels 2 and this said cradle is free to oscillate vertically between the sides of the frame 1 before mentioned. This cradle 8 is provided at its fore end with a digging share 10 having an approved cutting edge and is intended to cut a sod of the requisite size to treat the crop. The side rails of the cradle 8 are provided at their front ends with vertical plates 11 which depend slightly below the sides of the share 10 and are sharpened on their front edges to serve as colters and are bent outwardly at their rear to provide a free passage for the sod entering the machine. The sod cut by the share 10 and side plates 11 or colters is passed upwardly through the cradle by means of traveling bearers 12 secured to chains 13 which are mounted on sprockets 14 or the like. These sprockets 14 are mounted on spindles disposed transversely in the cradle 8 in an approved way. The rear edge of the share is scalloped (see Fig. 3) to permit of the free movement of the bearers 12 which are formed with spikes or teeth 15 on their upper surfaces. The said sprockets 14 are driven from a wheel 16 loosely mounted on the axle 9 and engaging a pinion on the spindle carrying the rear sprockets 14. This toothed wheel 16 may be made to take the motion of the traveling axle 9 by means of a clutch member 17 slidably fitted to the latter and operated by a lever 18 which is disposed in a convenient position for the driver to operate without moving from his seat. Located at the rear of the vertical side plates 11 of the digging share 10 are a plurality of rollers 19 having either plain, fluted or spiked peripheries. The object of these said rollers 19 is to prevent or relieve any congestion of the implement which may be caused by the sod being fed to the bearers and these rollers or the sides of the cradle 8 at the rear thereof preferably open outwardly to provide ample room for the material to pass freely therethrough. The top of the cradle 8 is fitted with a second set of sprockets 20 which are adapted to impart motion to traveling chains 21 having cross-bars 22 provided with long fingers or combs 23. These said traveling chains 21 are operated in an opposite direction to those carrying the bearers 12 by chain and sprocket gearings from the axle 9 of the traveling wheels.

The chain and sprocket gearing may comprise a wheel 24 loosely mounted on that end of the axle 9 opposite the one furnished with the toothed wheel 16 and adapted to take the motion of the traveling axle 9 by operating a clutch member 25 slidably mounted thereon. The said clutch member is operated by a lever 26 which may be disposed as illustrated or in any other convenient position. A chain 27 connects the sprocket wheel 24 to a second sprocket 28 fitted to one end of the transverse spindle 29 carrying the upper end of the chains 21. This chain 27 may be furnished with an idle roller or other approved means for taking up the slack.

The traveling chains 13 of the bearers 12 are passed over two or more elliptical sprockets 30 which impart a shaking motion to the bearers to break the sod thereby thoroughly separating the potatoes from the earth. The forward part of the cradle 8 is connected to the frame 1 by means of an adjustable bar or flexible member 31 so that part of the pull is taken directly from the cutting part of the implement. The connecting means shown in the drawings comprise chains having their lower ends secured to the cradle and their upper ends connected to screw bolts 32 which pass through lugs on the frame 1. The length of the said connections may be adjusted by operating nuts 33 fitted to the said bolts.

The forward end of the frame is provided with two upwardly extending brackets 34 in which is oscillatorily supported a cross shaft 35 having forwardly projecting arms 36 connected to the forward end of the cradle 8 by means of links 37. Fitted rigidly to one end of the cross shaft 35 is a lever 38 which may be operated to raise and lower the front of the cradle 8. The said lever 38 may be held in any desired position by means of a pawl and quadrant device 39 or by any other well known means. The potatoes and lumps of earth after passing through the machine are deposited upon a screen 40 consisting of a number of spring teeth or prongs of suitable length which project from the rear of the machine at an approved angle.

The top and rear end of the cradle 8 is provided with a cross bar 41 to which is fitted a plurality of inwardly projecting knives 42 having their edges facing downwardly. These knives 42 are so disposed that the teeth of the combs 23 pass upwardly therebetween and any weed or rubbish clinging to the latter is cut into pieces and readily falls through the machine. Thus, it will be understood that the knives keep the combs clean and thereby insure a maximum of efficiency. The forward comb-carrying sprockets 20 are fitted to a cross shaft 43 having its ends revolubly mounted in brackets 44. These brackets have depending arms 45 formed with a series of perforations for permitting a vertical adjustment of the shaft 43. The ends of the said shaft 43 are encircled by eyebolts 46 which pass through lugs 47 on the forward ends of the ratchets 44 and are furnished with adjustment means as nuts 48. The object of the said eyebolts and adjustment nuts is to provide means of adjusting the tension of the comb-carrying chains 21.

The outer ends of the traveling axle 9 are provided with sliding clutch members 49 which are adapted to engage the hubs of the hind traveling wheels when the same are rotating in a forward direction while being free to automatically disengage therefrom when the wheels reverse. This mechanism permits the machine to turn around or be backed without causing injury to the operative parts during which time the latter would be stationary. The said clutch members 49 are retained in their operative position by means of coiled springs 50 which encircle the axle 9 or by other similar means.

In lieu of making the digging share 10 a solid piece of metal as shown in Fig. 3 of the drawings it can be made as illustrated in Fig. 9 in which view a plurality of slots 51 are shown cut lengthwise in the share thus giving it a skeleton formation that will permit it to work with great ease even in sticky soils.

It will be readily obvious that by means of the number of adjustments provided the machine may be made to suit divers kinds of soils and conditions of crops, and further that various modifications may be made in the designs and operative parts of the machine within the scope of the invention as covered by the following claiming clauses.

What I do claim is:—

1. In a potato harvesting machine, a cradle having side members and a digging share secured between the front ends of the side members above the lower edges of the latter, said side members being provided at their front ends with upwardly extending side plates sharpened at their front edges to form colters and having outturned rear ends.

2. In a potato harvesting machine, a cradle constituting a conveyer frame, said cradle having side members provided at their front ends with upwardly extending side plates sharpened at their front edges and having outturned rear edges, a digging share secured between the side members at the front ends and above the lower edges of the latter, and vertically disposed rollers supported in rear of the rear edges of the upwardly extending side plates.

In witness whereof I have signed this specification in the presence of two witnesses.

HENRY J. DANIELS.

Witnesses:
A. J. CALLINAN,
W. A. ASHTON.